(12) United States Patent
Lou et al.

(10) Patent No.: US 9,123,371 B2
(45) Date of Patent: Sep. 1, 2015

(54) METHODS AND DEVICES FOR HEAD-MEDIA CONTACT DETECTION

(71) Applicant: SEAGATE TECHNOLOGY LLC, Cupertino, CA (US)

(72) Inventors: Huazhou Lou, Eden Prairie, MN (US); Lin Zhou, Eagan, MN (US); Vincent Engelkes, Maple Grove, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/050,526

(22) Filed: Oct. 10, 2013

(65) Prior Publication Data

US 2015/0103432 A1   Apr. 16, 2015

(51) Int. Cl.
| | |
|---|---|
| *G11B 5/02* | (2006.01) |
| *G11B 27/36* | (2006.01) |
| *G11B 21/02* | (2006.01) |
| *G11B 5/60* | (2006.01) |
| *G11B 5/48* | (2006.01) |
| *G11B 5/012* | (2006.01) |

(52) U.S. Cl.
CPC .............. *G11B 5/6076* (2013.01); *G11B 5/012* (2013.01); *G11B 5/4826* (2013.01); *G11B 5/6011* (2013.01)

(58) Field of Classification Search
None
See application file for complete search history.

(56) References Cited

U.S. PATENT DOCUMENTS

| | | | |
|---|---|---|---|
| 6,351,341 | B1 | 2/2002 | Lee et al. |
| 6,927,929 | B2 | 8/2005 | Gong et al. |
| 6,963,463 | B2 | 11/2005 | Sri-Jayantha et al. |
| 6,977,790 | B1 | 12/2005 | Chen et al. |
| 7,038,875 | B2 | 5/2006 | Lou et al. |
| 7,215,495 | B1 | 5/2007 | Che et al. |
| 7,542,227 | B2 | 6/2009 | Che et al. |
| RE40,975 | E | 11/2009 | Evans et al. |
| 7,724,462 | B2 | 5/2010 | Duan et al. |
| 7,903,365 | B2 | 3/2011 | Watanabe |
| 2003/0133218 | A1 | 7/2003 | Guo et al. |
| 2003/0218819 | A1 | 11/2003 | Sri-Jayantha et al. |
| 2005/0052775 | A1 | 3/2005 | He |
| 2007/0253090 | A1 | 11/2007 | Hirano |
| 2008/0137225 | A1 * | 6/2008 | Duan et al. ................. 360/75 |
| 2010/0177429 | A1 | 7/2010 | Lee et al. |
| 2011/0069410 | A1 * | 3/2011 | Kashiwase et al. ......... 360/75 |

OTHER PUBLICATIONS

Ki Myung Lee, "Noninvasive vibration diagnostics to detect head-disk contact in hard disk drives," IEEE Transactions on Magnetics, vol. 42, No. 8, 2090-95, Aug. 2006.

* cited by examiner

*Primary Examiner* — Andrew L Sniezek
(74) *Attorney, Agent, or Firm* — Braden Katterheinrich

(57) ABSTRACT

In certain embodiments, a head-suspension assembly includes a resonator attached to either a head or gimbal. The resonator is configured to resonate at a predefined resonant frequency. In certain embodiments, disc drives includes a recording medium, a head-suspension assembly, and a resonator. The resonator is attached to either a head or gimbal of the head-suspension assembly. The resonator is configured to resonate at a predefined resonant frequency.

18 Claims, 3 Drawing Sheets

METHODS AND DEVICES FOR HEAD-MEDIA CONTACT DETECTION

SUMMARY

Certain embodiments of the present disclosure are generally directed to devices, systems, and methods for detecting head-media contact.

In certain embodiments, a head-suspension assembly includes a resonator attached to either a head or gimbal. The resonator is configured to resonate at a predefined resonant frequency.

In certain embodiments, a disc drive includes a recording medium, a head-suspension assembly, and a resonator. The resonator is attached to either a head or gimbal of the head-suspension assembly. The resonator is configured to resonate at a predefined resonant frequency.

DETAILED DESCRIPTION

The present disclosure relates to devices, systems, and methods for detecting head-to-media contact. During operation of a data storage device, read/write heads are positioned in close proximity to recording media to write and read data to and from the media. The distance between heads and media can be referred to as head-to-media spacing. Head-to-media spacing typically decreases as data storage devices increase in areal density. That is, as data storage devices store more data bits per disk, devices are typically designed so that read/write heads fly closer to media during operation. When heads contact or are close to contacting recording media, heads will essentially follow the recording media's surface topography. Because recording media are polished, the surface's topography is typically characterized by peaks and valleys—with small distances between two. As a result, heads move at relatively small amplitudes when contacting or close to contacting recording media. Detecting contact that generates such amplitudes can be difficult. Certain embodiments of the present disclosure are accordingly directed to systems, devices, and methods for detecting head-to-media contact.

Figure 1:
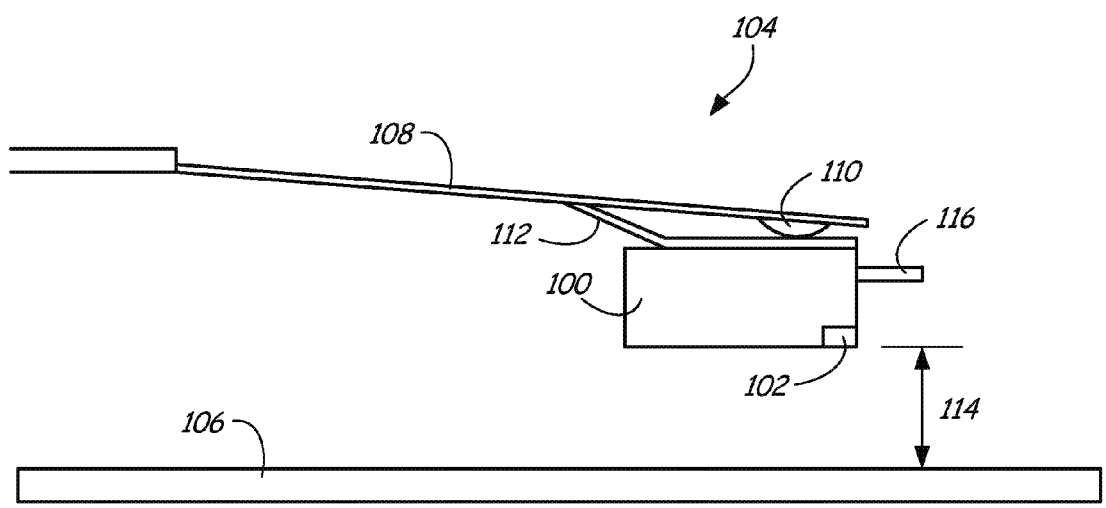
FIG. 1 provides a side view of a head-suspension assembly, in accordance with certain embodiments of the present disclosure.

FIG. 1 shows a head 100—sometimes referred to as a slider—having a read/write portion 102 containing magnetic reader and writer elements. The head 100 is coupled to a suspension 104, which positions the head 100 above a recording medium 106. Although not shown, the recording medium 106 may include peaks and valleys along its surface. The suspension 104 includes a load beam 108 with a dimple 110 that supports a gimbal 112. The gimbal 112 is coupled with the head 100 and allows the head 100 to pitch and yaw while "flying" over the recording medium 106. The fly-height or distance between the head 100 and recording medium 108 is called head-to-media spacing 114.

Attached to the head 100 is a resonator 116, which is configured to be excited at a predefined resonant frequency. The predefined resonant frequency can be a range that may equal or overlap a frequency range of the recording medium's surface topography, which can be characterized using measuring techniques like interferometty and laser Doppler velocimetry. In certain embodiments, a frequency of the recording medium's surface topography ranges between 10 kHz and 100 kHz. In other embodiments, a frequency of the recording medium's surface topography ranges between 10 kHz and 50 kHz. The predefined frequency can also be a range that may equal or overlap a frequency range of a head gimbal assembly's resonant frequency. Because of the resonator's configuration, the resonator 116 vibrates or moves at a larger amplitude than the head 100 does when following a recording medium's surface topography during contact or when close to contact. As will be described in more detail below, the resonator's larger amplitude allows head-media contact detection even when the head 100 itself moves with little to no modulation, thus permitting early contact detection.

Figure 2:
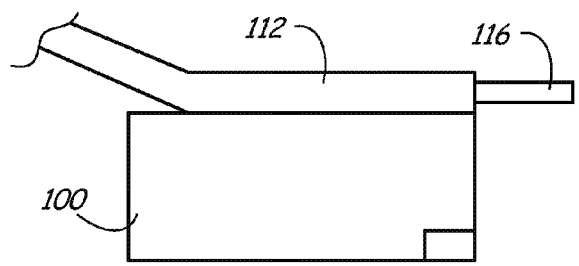
FIG. 2 provides a side view of a head, in accordance with certain embodiments of the present disclosure.

FIG. 1 shows the resonator 116 extending from a trailing edge of the head 100, while FIG. 2 shows the resonator 116 extending from a distal end of the gimbal 112. The present disclosure is not limited to any specific position of the resonator 116. When the head 100 or gimbal 112 is subjected to energy from the recording medium 106, the energy (e.g., vibration due to contact forces, friction, stiction) is transmitted through the head 100 and/or gimbal 112 to the resonator 116. The resonator 116 can be integrally formed with the gimbal 112 or head 100 or formed as a separate component and attached by various methods including welding, using adhesives, etc. The resonator 116 can also be attached to the head 100 with a solder bond to metals pads on the head 100. The resonator 116 can have a low stiffness and be characterized as a high-gain mass-spring system. As will be shown below, multiple resonators can be implemented.

For clarity, the elements of FIG. 1 are not necessarily drawn to scale and may not show all components sometimes associated with disc drive suspensions and heads, like heaters that induce thermal head protrusion to lower fly height.

Figure 3:
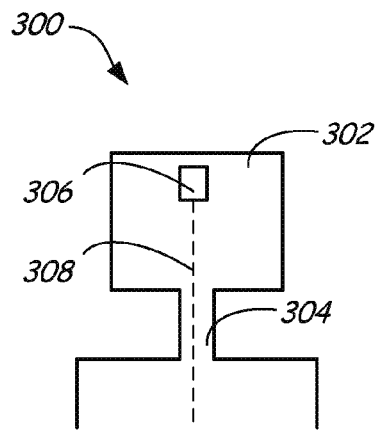
FIGS. 3 and 4 provide a top view of various resonators, in accordance with certain embodiments of the present disclosure.
Figure 4:
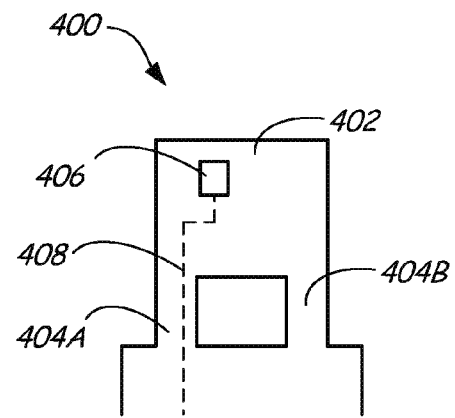

FIGS. 3 and 4 illustrate various configurations of resonators in accordance with certain embodiments of the present disclosure. Resonator 300, shown in FIG. 3, is configured to have a resonant frequency within a frequency range consistent with or overlapping a frequency of a recording medium's surface topography. In some embodiments, the resonant frequency is different than those of other disc drive components such as motors, pivot bearings, head-suspension assemblies, etc. so that the resonator 300 is excited primarily during or near contact with a recording medium. In some embodiments, the resonator's resonant frequency is equal to a head-media contact frequency.

Resonator 300 includes distal section 302 and proximal section 304. Proximal section 304 transmits to distal section 302 energy imparted by a recording medium's topography through a head and/or gimbal. Sensitivity of resonator 300 (e.g., how much energy before the resonator 300 is excited) can be increased by modifying a width of the proximal section 304 to be smaller than that of distal section 302 as shown in FIG. 3. In certain embodiments, a thickness of the distal section 302 can be thicker or longer than the proximal section 304.

Resonators can include a sensor or vibration transducer for sensing resonators' vibration. Sensor 306 can be integrated into or attached to the resonator 300 and can be a capacitive element, resistive element, piezoelectric element, magnetic element, strain gauge, or an Eddy-current sensing element. The sensor 306 is shown to be attached to the distal section 302 but can be positioned at other locations. Moreover, resonators can include multiple sensors. The sensor 306 generates a signal that indicates whether the resonator is vibrating. The generated signal is transmitted by one or more electrical leads 308 to a fly-height control system that controls fly height. In certain embodiments, if the sensor senses that the resonator is vibrating, the fly-height control system may receive a sensor signal, determine that contact has occurred, and attempt to increase a head's fly height. Determining whether contact has occurred may include comparing the sensed vibration to a pre-determined threshold and then concluding that head-media contact has occurred.

Resonator 400 functions similarly to resonator 300. Resonator 400 includes a distal section 402 coupled to multiple proximal sections 404A and B. Widths of proximal sections 404A and B can vary and can affect the sensitivity of resonator 400. The sensor 406 is attached to the distal section 402 and is electrically connected to a fly height control system through one or more leads 408.

Figure 5:
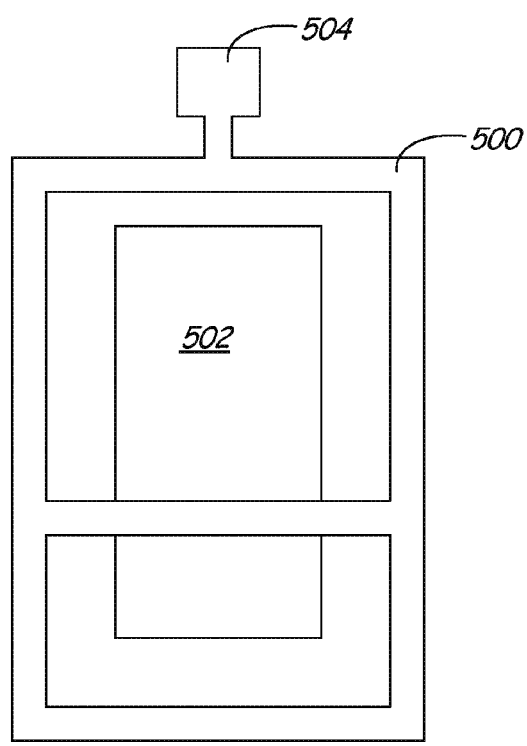
FIGS. 5 and 6 provide a top view of various head-gimbal assemblies, in accordance with certain embodiments of the present disclosure.
Figure 6:
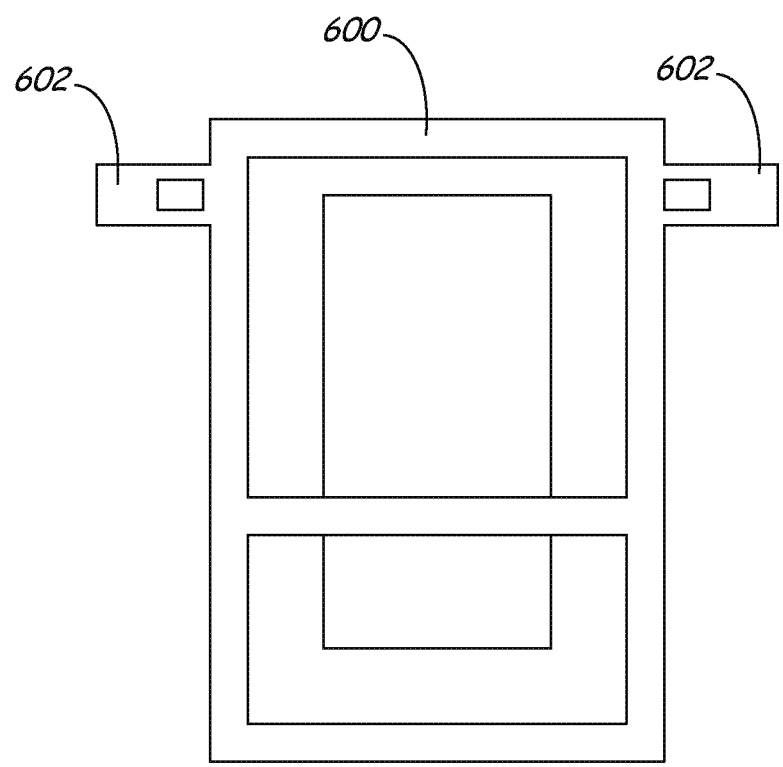

FIGS. 5 and 6 illustrate various configurations of resonators attached to a gimbal 500. Although the figures show resonators coupled to the gimbal 500, resonators can be coupled to or directly attached to a variety of disc drive components including heads 502 and suspension components.

FIG. 5 shows the gimbal 500 comprising a single resonator 504 formed at a distal end of the gimbal. FIG. 5 shows the resonator 504 being integral with gimbal 500 although resonator 504 can be a separate piece and can be positioned elsewhere. The resonator 504 is similar to the resonator shown in FIG. 3 but is not limited to such a design. FIG. 6 shows a gimbal 600 comprising multiple resonators 602 formed on sides of the gimbal. The resonators 602 are similar to the resonator in FIG. 4 but are not limited to such a design.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A disc drive comprising:
   a recording medium;
   a head-suspension assembly including a head and a gimbal, the head including a read/write portion, the head configured to be positioned over the recording medium for reading from and writing to the recording medium;
   a resonator attached to either the head or gimbal and extending from the head or gimbal as a cantilever, the resonator configured to resonate at a predefined resonant frequency and configured to resonate in response to contact between the head and recording-medium; and
   a sensor attached to the resonator and configured and arranged to sense vibrations of the resonator.

2. The disc drive of claim 1, wherein the predefined resonant frequency ranges from 10 kHz to 100 kHz.

3. The disc drive of claim 2, wherein the predefined resonant frequency ranges from 10 kHz to 50 kHz.

4. The disc drive of claim 1, wherein the resonator is integrally formed as one piece with the gimbal.

5. The disc drive of claim 1, wherein the resonator is directly attached to the head.

6. The disc drive of claim 1, wherein the resonator includes a distal section and a proximal section, the proximal being directly attached to the head or the gimbal having a width smaller than a width of the distal section, which is indirectly attached to the head or the gimbal.

7. The disc drive of claim 1, wherein the sensor is attached to a distal section of the resonator.

8. The disc drive of claim 1, wherein the resonator is attached to metal bonds on the head.

9. The disc drive of claim 1, further comprising:
   a plurality of resonators.

10. A head-suspension assembly comprising:
    a resonator attached to either a head or gimbal so that the resonator extends from the head or the gimbal as a cantilever,
    wherein the resonator is configured to resonate at a predefined resonant frequency and includes a distal section and a proximal section, the proximal section being directly attached to the head or the gimbal and having a width smaller than a width of the distal section, which is indirectly attached to the head or the gimbal.

11. The assembly of claim 10, wherein the predefined resonant frequency ranges from 10 kHz to 100 kHz.

12. The assembly of claim 11, wherein the predefined resonant frequency ranges from 10 kHz to 50 kHz.

13. The assembly of claim 10, wherein the resonator is integrally formed as one piece with the gimbal.

14. The assembly of claim 10, further comprising:
    a sensor attached to the resonator and configured and arranged to sense vibrations of the resonator.

15. The assembly of claim 14, wherein the sensor is attached to a distal section of the resonator.

16. A disc drive comprising:
    a recording medium;
    a head-suspension assembly including a head and a gimbal, the head including a read/write portion, the head configured to be positioned over the recording medium for reading from and writing to the recording medium;
    a resonator attached to either the head or gimbal, the resonator configured to resonate at a predefined resonant frequency and configured to resonate in response to a contact between the head and recording medium and including a distal section and a proximal section, wherein the proximal section is directly attached to the head or the gimbal and has a width smaller than a width of the distal section, which is indirectly attached to the head or the gimbal; and
    a sensor attached to the resonator and configured and arranged to sense vibrations of the resonator.

17. The disc drive of claim 16, wherein the resonator is integrally formed as one piece with the gimbal.

18. The disc drive of claim 16, wherein the resonator is directly attached to the head.

* * * * *